US012473862B2

(12) United States Patent
Miller et al.

(10) Patent No.: US 12,473,862 B2
(45) Date of Patent: Nov. 18, 2025

(54) PURGE SYSTEM FOR A HYDROGEN FUEL SYSTEM

(71) Applicant: General Electric Company, Schenectady, NY (US)

(72) Inventors: Brandon W. Miller, Middletown, OH (US); Sean Binion, Loveland, OH (US); Justin P. Smith, Cincinnati, OH (US); Nathan E. Gibson, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/663,314

(22) Filed: May 13, 2022

(65) Prior Publication Data

US 2023/0366353 A1  Nov. 16, 2023

(51) Int. Cl.
| | |
|---|---|
| *F02C 7/25* | (2006.01) |
| *F02C 7/22* | (2006.01) |
| *F02C 7/224* | (2006.01) |
| *F02C 7/232* | (2006.01) |

(52) U.S. Cl.
CPC .............. *F02C 7/25* (2013.01); *F02C 7/222* (2013.01); *F02C 7/224* (2013.01); *F02C 7/232* (2013.01); *F05D 2240/36* (2013.01); *F05D 2260/605* (2013.01)

(58) Field of Classification Search
CPC .. F02C 7/224; F02C 7/222; F02C 7/22; F02C 7/236; F02C 7/2365; F02C 7/232; F02C 7/25; F05D 2240/36; F05D 2260/605; F02D 2260/605

See application file for complete search history.

(56) References Cited

U.S. PATENT DOCUMENTS

| | | | | |
|---|---|---|---|---|
| 2,984,978 A | | 5/1961 | Griffith | |
| 3,841,089 A | * | 10/1974 | Clark | F02C 9/26 |
| | | | | 137/202 |
| 4,032,091 A | * | 6/1977 | Reddy | B64D 37/32 |
| | | | | 244/135 R |

(Continued)

FOREIGN PATENT DOCUMENTS

| | | |
|---|---|---|
| EP | 3048281 B1 | 4/2017 |
| FR | 2264973 A1 | 10/1975 |

(Continued)

OTHER PUBLICATIONS

Sibbach et al., U.S. Appl. No. 17/209,719, filed Mar. 23, 2021.

(Continued)

*Primary Examiner* — Thomas P Burke
(74) *Attorney, Agent, or Firm* — Carter, DeLuca & Farrell LLP

(57) ABSTRACT

A hydrogen fuel system including a fuel delivery assembly, a purge gas source, and a vent. The fuel delivery assembly is configured to receive hydrogen fuel from a hydrogen fuel source and to provide the hydrogen fuel from the hydrogen fuel source to a power generator. The purge gas source is fluidly coupled to the fuel delivery assembly and configured to provide a purge gas to the fuel delivery assembly. The vent is fluidly coupled to the fuel delivery assembly and configured to vent hydrogen fuel from the fuel delivery assembly when the purge gas is provided to the fuel delivery assembly.

18 Claims, 9 Drawing Sheets

(56) References Cited

U.S. PATENT DOCUMENTS

| | | | |
|---|---|---|---|
| 4,062,184 A | 12/1977 | Hagen | |
| 7,281,681 B2 | 10/2007 | MacCready et al. | |
| 7,806,365 B2 | 10/2010 | Miller et al. | |
| 7,810,669 B2 | 10/2010 | Westenberger | |
| 8,573,245 B1* | 11/2013 | Jansen | F02C 7/232 |
| | | | 137/240 |
| 8,939,166 B2 | 1/2015 | Shurtleff et al. | |
| 8,950,195 B2 | 2/2015 | Watts | |
| 9,509,175 B2 | 11/2016 | Haerms et al. | |
| 2011/0036092 A1* | 2/2011 | Lawson | F23K 5/002 |
| | | | 60/734 |
| 2013/0118178 A1* | 5/2013 | Sabelhaus | F02C 7/232 |
| | | | 60/39.463 |
| 2013/0186057 A1* | 7/2013 | Shanmugam | F23R 3/36 |
| | | | 60/776 |
| 2014/0165580 A1* | 6/2014 | Simmons | F02C 9/28 |
| | | | 60/734 |
| 2014/0230402 A1* | 8/2014 | Morawski | F02C 7/232 |
| | | | 60/39.094 |
| 2015/0300260 A1* | 10/2015 | Wollenweber | F02C 9/40 |
| | | | 60/39.12 |
| 2015/0344145 A1* | 12/2015 | Epstein | F17C 3/00 |
| | | | 244/135 C |
| 2018/0347407 A1* | 12/2018 | Mohr | F02C 9/16 |
| 2020/0080480 A1 | 3/2020 | Horikawa et al. | |
| 2020/0088098 A1* | 3/2020 | Roberge | F02C 7/16 |
| 2022/0349343 A1* | 11/2022 | Durocher | F02C 7/222 |

FOREIGN PATENT DOCUMENTS

| | | |
|---|---|---|
| FR | 3127269 A1 | 3/2023 |
| FR | 3130896 A1 | 6/2023 |
| FR | 3130897 A1 | 6/2023 |
| FR | 3133367 A1 | 9/2023 |
| FR | 3133368 A1 | 9/2023 |

OTHER PUBLICATIONS

Sibbach et al., U.S. Appl. No. 17/209,721, filed Mar. 23, 2021.
Sibbach et al., U.S. Appl. No. 17/209,724, filed Mar. 23, 2021.
Gibson et al., U.S. Appl. No. 17/474,156, filed Sep. 14, 2021.
Constantinos et al., U.S. Appl. No. 17/449,971, filed Oct. 5, 2021.
Extended European Search Report dated Sep. 22, 2025 issued in corresponding European Application No. 25189348.3 (9 pages).

* cited by examiner

PURGE SYSTEM FOR A HYDROGEN FUEL SYSTEM

TECHNICAL FIELD

The present disclosure relates to fuel systems, and, in particular, to fuel systems for aircraft, the fuel system being a hydrogen fuel system.

BACKGROUND

The propulsion system for commercial aircraft typically includes one or more aircraft engines, such as turbofan jet engines. These engines may be powered by aviation turbine fuel, which is, typically, a combustible hydrocarbon liquid fuel, such as a kerosene-type fuel, having a desired carbon number and carbon-to-hydrogen ratio. Such fuel produces carbon dioxide upon combustion, and improvements to reduce or to eliminate such carbon dioxide emissions in commercial aircraft are desired.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
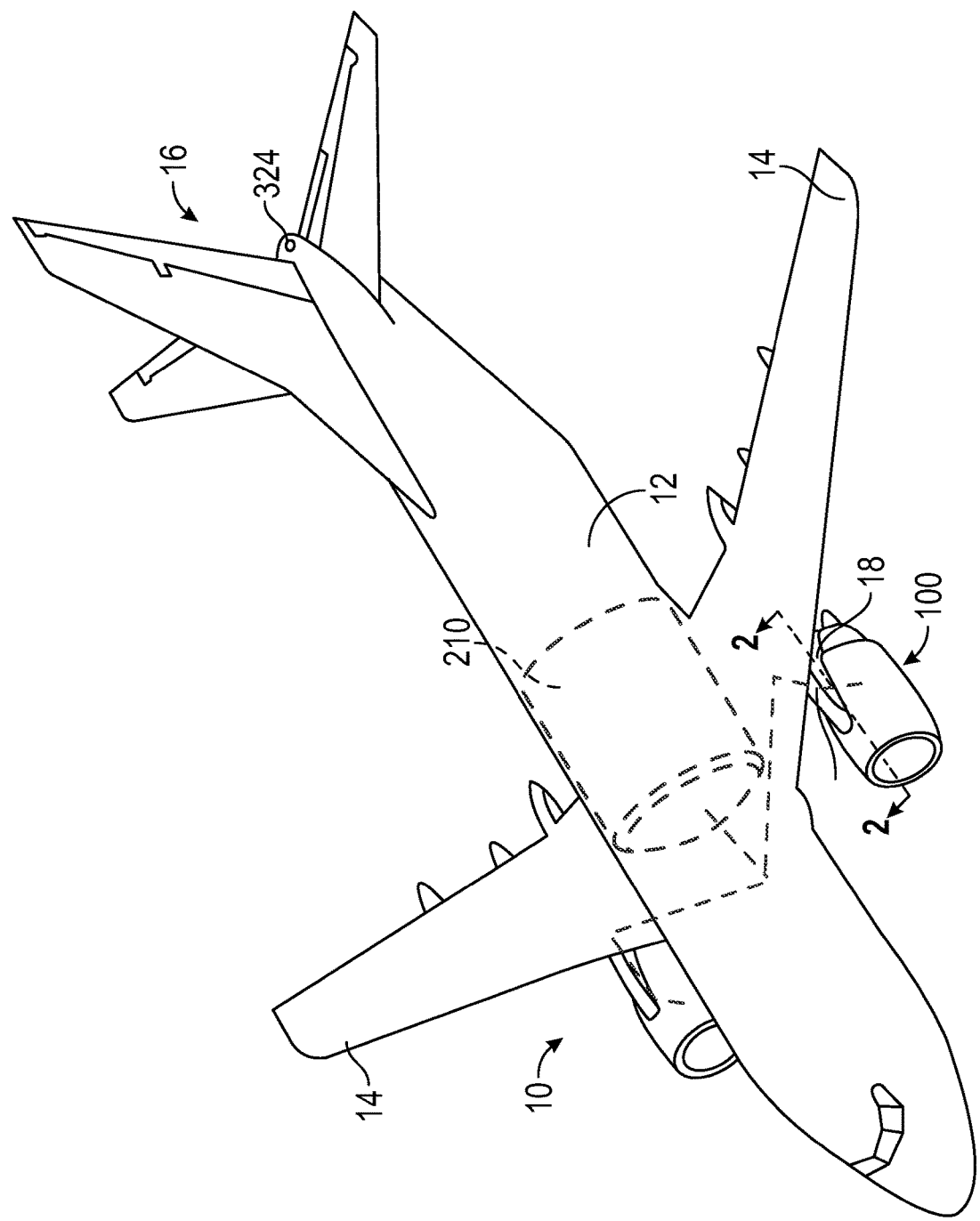
FIG. 1 is a schematic perspective view of an aircraft having a hydrogen fuel system according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or an exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "directly upstream" or "directly downstream," when used to describe the relative placement of components in a fluid pathway, refer to components that are placed next to each other in the fluid pathway without any intervening components between them other than an appropriate fluid coupling, such as a pipe, a tube, a valve, or the like, to fluidly couple the components. Such components may be spaced apart from each other with intervening components that are not in the fluid pathway.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

To reduce carbon dioxide emissions from commercial aircraft, a hydrogen fuel may be used. Hydrogen fuel, however, poses a number of challenges as compared to combustible hydrocarbon liquid fuel. For example, hydrogen fuel has a relatively low boiling point, and, in its gaseous form, hydrogen fuel has a much lower power density. Hydrogen fuel, when in a gaseous form, also tends to seep through materials and attachment points between components without leaving residue. Hydrogen fuel is colorless and odorless. Hydrogen fuel is also highly reactive (relative to other fuels, such as Jet-A fuel) with a wide range of flammability limits.

The present disclosure discusses ways to improve the use of hydrogen fuel systems and, particularly, such fuel systems used in aircraft. The various embodiments, as described herein and as shown in the figures, describe a hydrogen fuel purge system that may be used to actively purge the fuel lines, the fittings, the valves, the sensors, and the components that receive hydrogen in the case of a leak. The purge may be carried away immediately and exhausted externally.

The hydrogen fuel systems discussed herein include hydrogen fuel purge systems that are particularly suited for use on aircraft. FIG. 1 is a perspective view of an aircraft 10 that may implement various preferred embodiments. The aircraft 10 includes a fuselage 12, a pair of wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 200 (see FIG. 3). In the embodiments discussed herein, the fuel is a hydrogen fuel that is stored in a fuel tank 210 of the fuel system 200. As shown in FIG. 1, at least a portion of the fuel tank 210 is located in the fuselage 12 and, in this embodiment, entirely within the fuselage 12. The fuel tank 210, however, may be located at other suitable locations in the fuselage 12 or the wing 14, such as with a portion of the fuel tank 210 in the fuselage 12 and a portion of the fuel tank 210 in the wing 14. Alternatively, the fuel tank 210 may also be located entirely within the wing 14. In the embodiment shown in FIG. 1, a single fuel tank 210 is used, and the fuel tank 210 is located within the fuselage such that, relative to the forward direction and the aft direction, the fuel tank 210 is located at the wing center of lift. Any suitable number of fuel tanks 210 may be used, however, including a plurality of fuel tanks 210. The plurality of fuel tanks 210 may include, for example, a forward fuel tank and an aft fuel tank. The forward fuel tank and the aft fuel tank may be located in the fuselage 12 and balanced about the wing center of lift to promote the stability of the aircraft 10 during flight. In another example, the plurality of fuel tanks 210 may include two separate tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). The aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). In addition, the embodiments described herein may also be applicable to other applications where hydrogen is used as a fuel. The engines described herein are gas turbine engines, but the embodiments described herein also may be applicable to other engines. Further, the engine, specifically, the gas turbine engine, is an example of a power generator using hydrogen as a fuel, but hydrogen may be used as a fuel for other power generators, including, for example, fuel cells (hydrogen fuel cells). Such power generators may be used in various applications including stationary power-generation systems (including both gas turbines and hydrogen fuel cells) and other vehicles beyond the aircraft 10 explicitly described herein, such as boats, ships, cars, trucks, and the like.

Figure 2:
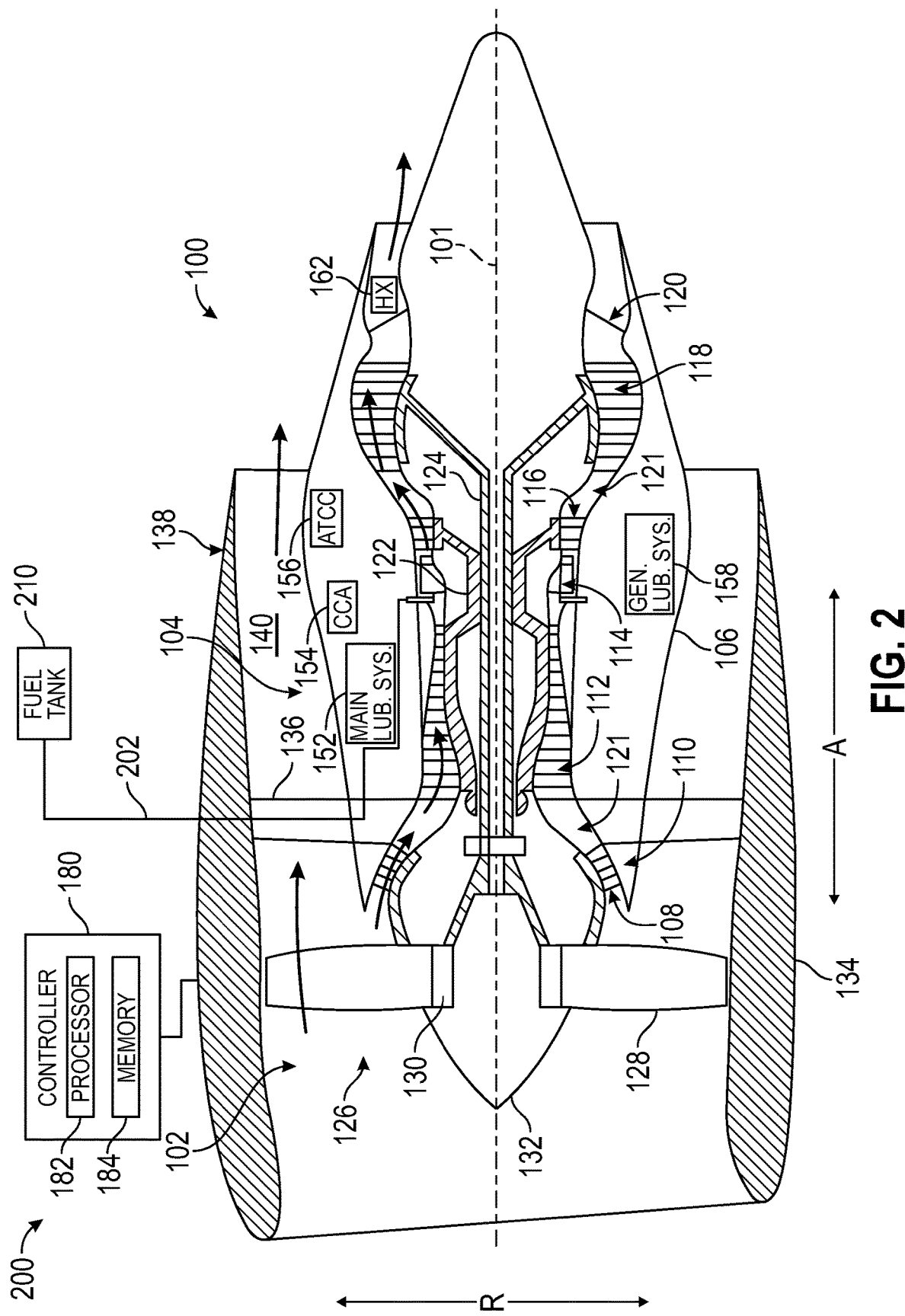
FIG. 2 is a schematic, cross-sectional view, taken along line 2-2 in FIG. 1, of a gas turbine engine of the aircraft shown in FIG. 1.

FIG. 2 is a schematic, cross-sectional view of one of the engines 100 used in the propulsion system for the aircraft 10 shown in FIG. 1. The engine 100 shown in FIG. 2 is a high-bypass turbofan engine. The engine 100 may also be referred to as a turbofan engine 100 herein. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

The turbomachine 104 depicted in FIG. 2 includes a tubular outer casing 106 (housing or nacelle) that defines an annular inlet 108. The outer casing 106 encases, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flow path 121 extending from the annular inlet 108 to the jet exhaust nozzle section 120. The turbofan engine further includes one or more drive shafts. More specifically, the turbofan engine includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130 spaced apart in a circumferential direction around the disk 130. The fan blades 128 and the disk 130 are rotatable, together, about the longitudinal centerline (axis) 101 by the LP shaft 124. The disk 130 is covered by a rotatable front hub 132 aerodynamically contoured to promote an airflow through the plurality of fan blades 128. Further, an annular fan casing or outer nacelle 134, circumferentially surrounds the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 210 to the engine 100, and, more specifically, to a fuel manifold 172 (not labeled in FIG. 2, see FIG. 3) of the combustion section 114 of the turbomachine 104 of the turbofan engine 100.

The turbofan engine 100 also includes various accessory systems to aid in the operation of the turbofan engine 100 and/or an aircraft including the turbofan engine 100. For example, the turbofan engine 100 may include a main lubrication system 152, a compressor cooling air (CCA)

system 154, an active thermal clearance control (ATCC) system 156, and a generator lubrication system 158, each of which is depicted schematically in FIG. 2. The main lubrication system 152 is configured to provide a lubricant to, for example, various bearings and gear meshes in the compressor section, the turbine section, the HP spool 122, and the LP shaft 124. The lubricant provided by the main lubrication system 152 may increase the useful life of such components and may remove a certain amount of heat from such components. The compressor cooling air (CCA) system 154 provides air from one or both of the HP compressor 112 or the LP compressor 110 to one or both of the HP turbine 116 or the LP turbine 118. The active thermal clearance control (ATCC) system 156 cools a casing of the turbine section to maintain a clearance between the various turbine rotor blades and the turbine casing within a desired range throughout various engine operating conditions. The generator lubrication system 158 provides lubrication to an electronic generator (not shown), as well as cooling/heat removal for the electronic generator. The electronic generator may provide electrical power to, for example, a start-up electrical motor for the turbofan engine 100 and/or various other electronic components of the turbofan engine 100 and/or an aircraft including the turbofan engine 100.

Heat from these accessory systems 152, 154, 156, 158, and other accessory systems may be provided to various heat sinks as waste heat from the turbofan engine 100 during operation, such as to various vaporizers 221, 223, as discussed below with regard to FIG. 3. Additionally, the turbofan engine 100 may include one or more heat exchangers 162 within, for example, the core air flow path 121, such as the turbine section or the jet exhaust nozzle section 120. Such heat exchangers 162 may be used to extract waste heat from an airflow therethrough also to provide heat to various heat sinks, such as the vaporizers 221, 223, discussed below.

The turbofan engine 100 discussed herein is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, and the like. Still further, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and the shaft driving the fan, such as the LP shaft 124), or a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines, as discussed above. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158, and 162, discussed above.

The engine 100 may also include an engine controller 180. The engine controller 180 is configured to operate various aspects of the engine 100 and the fuel system 200, including, for example, opening and closing valves, such as a shut-off valve 204 or diverter valves 312, 326, operating metering valve 240, operating the vaporizers 221, 223, and operating pumps 230, 314 (FIG. 3). In this embodiment, the engine controller 180 is a computing device having one or more processors 182 and one or more memories 184. The processor 182 can be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 184 can include one or more computer-readable media, including, but not limited to, non-transitory computer-readable media, a computer-readable non-volatile medium (e.g., a flash memory), a RAM, a ROM, hard drives, flash drives, and/or other memory devices.

The memory 184 can store information accessible by the processor 182, including computer-readable instructions that can be executed by the processor 182. The instructions can be any set of instructions or a sequence of instructions that, when executed by the processor 182, causes the processor 182 and the engine controller 180 to perform operations. In some embodiments, the instructions can be executed by the processor 182 to cause the processor 182 to complete any of the operations and functions for which the engine controller 180 is configured, as will be described further below. The instructions can be software written in any suitable programming language or can be implemented in hardware. Additionally, and/or alternatively, the instructions can be executed in logically and/or virtually separate threads on the processor 182. The memory 184 can further store data that can be accessed by the processor 182.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
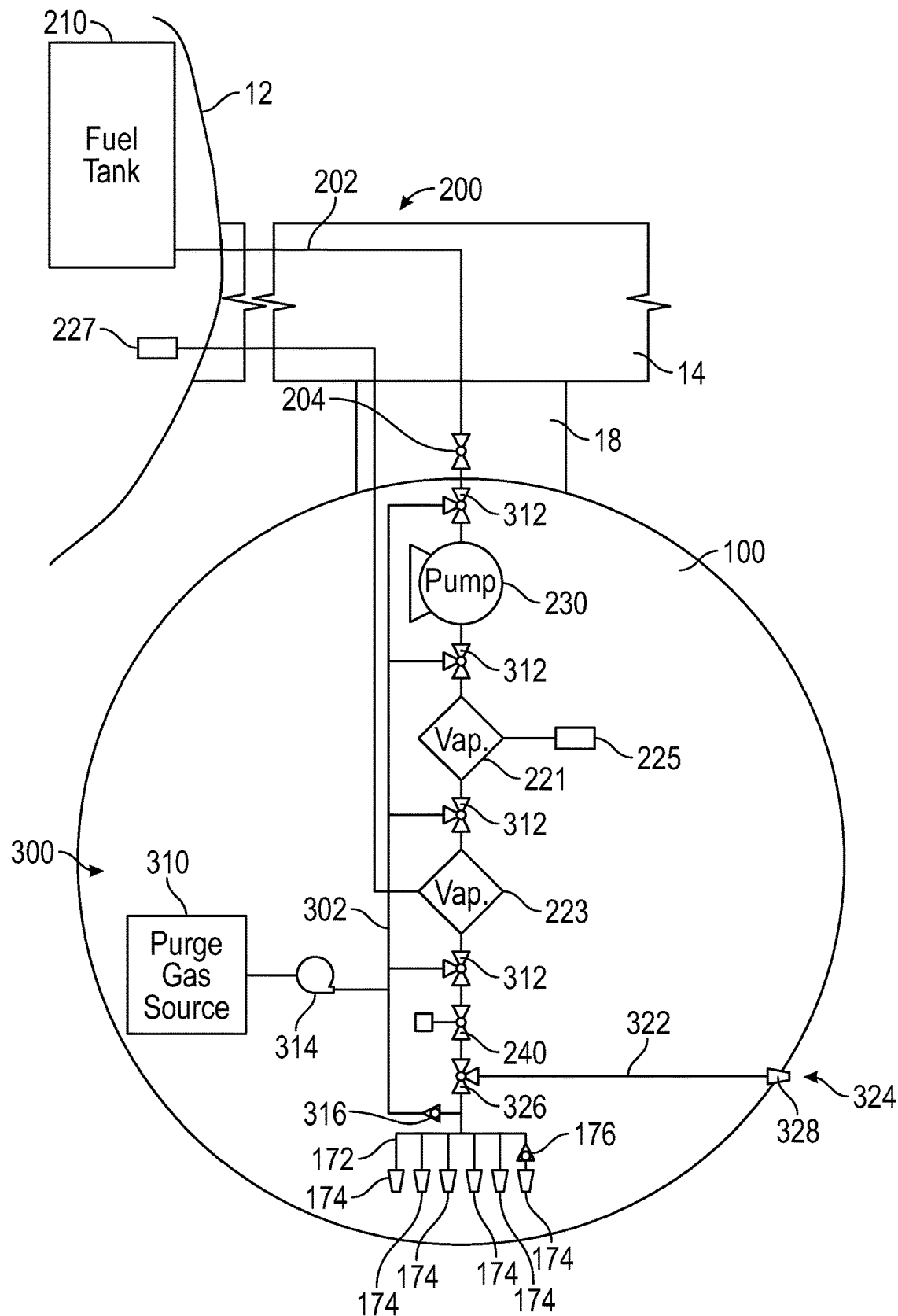
FIG. 3 is a schematic view of a fuel system including a hydrogen fuel purge system according to an embodiment of the present disclosure.

FIG. 3 is a schematic view of the fuel system 200 according to an embodiment of the present disclosure. The fuel system 200 is configured to store the hydrogen fuel for the engine 100 in the fuel tank 210 and to deliver the hydrogen fuel to the engine 100 via a fuel delivery assembly 202. The fuel delivery assembly 202 includes tubes, pipes, and the like, to fluidly connect the various components of the fuel system 200 to the engine 100. The fuel tank 210 may be configured to hold the hydrogen fuel at least partially within the liquid phase, and may be configured to provide hydrogen fuel to the fuel delivery assembly 202 substantially completely in the liquid phase, such as completely in the liquid phase. For example, the fuel tank 210 may have a fixed volume and contain a volume of the hydrogen fuel in the liquid phase (liquid hydrogen fuel). As the fuel tank 210 provides hydrogen fuel to the fuel delivery assembly 202 substantially completely in the liquid phase, the volume of the liquid hydrogen fuel in the fuel tank 210 decreases and the remaining volume in the fuel tank 210 is made up by, for example, hydrogen in the gaseous phase (gaseous hydrogen). As used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 210 at very low (cryogenic) temperatures. For example, the hydrogen fuel may be stored in the fuel tank 210 at about negative two hundred fifty-three degrees Celsius or less at atmospheric pressure, or at other temperatures and pressures to maintain the hydrogen fuel substantially in the liquid phase. The fuel tank 210 may be a double-walled cryogenic storage tank made from known materials such as titanium, Inconel®, aluminum, or composite materials. The fuel tank 210 and the fuel system 200 may include a variety of supporting structures and components to facilitate storing the hydrogen fuel in such a manner.

The liquid hydrogen fuel is supplied from the fuel tank 210 to the fuel delivery assembly 202. The fuel delivery assembly 202 may include one or more lines, conduits, pipes, etc., configured to carry the hydrogen fuel between the fuel tank 210 and the engine 100. The fuel delivery assembly 202 provides a flow path of the hydrogen fuel from the fuel tank 210 downstream to the engine 100. Herein, the terms "downstream" and "upstream" may be used to describe the position of components relative to the direction of flow of the hydrogen fuel in the flow path of the fuel delivery assembly 202. The fuel delivery assembly 202 may also include various valves (for example, shut-off valve 204) and other components to deliver the hydrogen fuel to the engine 100 that are not shown in FIG. 3. The fluid lines discussed herein, particularly, those conveying liquid hydrogen, may be vacuum jacketed pipes.

The fuel tank 210 in this embodiment is a hydrogen fuel source, and the fuel delivery assembly 202 is configured to receive hydrogen fuel from the fuel tank 210 (hydrogen fuel source) and to provide the hydrogen fuel from the hydrogen fuel source to the engine 100 (power generator), and, more specifically, a fuel input array (e.g., the fuel manifold 172 and the fuel nozzles 174, discussed further below) of the engine 100. The fuel system 200 may include a shut-off valve 204, positioned, for example, in the pylon 18 or at another position between the fuel tank 210 and the engine 100 that can be used to isolate and to disconnect the fuel tank 210 from the components of the fuel delivery assembly 202 that are downstream of the shut-off valve 204. The shut-off valve 204 may, thus, be positioned to isolate the components of the fuel system 200 that are located in the engine from the components of the fuel system 200 located in the remaining portion of the aircraft 10.

The hydrogen fuel is delivered to the engine 100 by the fuel delivery assembly 202 in the liquid phase, the gaseous phase, the supercritical phase, or both of the gaseous phase and the supercritical phase. The fuel system 200, thus, includes at least one vaporizer 221, 223 in fluid communication with the fuel delivery assembly 202 to heat the liquid hydrogen fuel flowing through the fuel delivery assembly 202. In the embodiment shown in FIG. 3, the fuel system 200 includes two vaporizers, a main vaporizer 221 and a secondary vaporizer 223. Each vaporizer 221, 223 is positioned in the flow path of the hydrogen fuel between the fuel tank 210 and the engine 100. In the embodiment shown in FIG. 3, each vaporizer 221, 223 is positioned at least partially within the engine 100. When positioned in the engine 100, the vaporizers 221, 223 may be located in the nacelle 134, for example. The vaporizers 221, 223 may, however, be positioned at other suitable locations in the flow path of the hydrogen between fuel tank 210 and the engine 100. For example, the vaporizers 221, 223 may be positioned external to the engine 100 and positioned in the fuselage 12, the wing 14, or the pylon 18.

Each vaporizer 221, 223 is in thermal communication with at least one heat source, such as a primary heat source 225, a secondary heat source 227, or both. In this embodiment, the primary vaporizer 221 is configured to operate once the engine 100 is in a thermally stable condition and the primary heat source 225 is waste heat from the engine 100. The main vaporizer 221 is, thus, thermally connected to at least one of the main lubrication system 152, the compressor cooling air system 154, the active thermal clearance control system 156, the generator lubrication system 158, and the heat exchangers 162 to extract waste heat from the engine 100 to heat the hydrogen fuel. In such a manner, it will be appreciated that the vaporizer 221 is configured to operate by drawing heat from the primary heat source 225 once the engine 100 is capable of providing enough heat, via the primary heat source 225, to the vaporizer 221, in order to facilitate operation of the vaporizer 221.

The secondary vaporizer 223 of this embodiment is a combination start-up and trim vaporizer that may used to heat the liquid hydrogen fuel flowing through the fuel delivery assembly 202 when the main vaporizer 221 is not sufficient to heat the hydrogen fuel. During start-up of the engine 100, for example, the engine 100 may not be in a thermally stable condition, and the secondary vaporizer 223 is used during start-up (or prior to start-up) to heat the hydrogen fuel instead of the main vaporizer 221. In this example, the secondary vaporizer 223 operates as a start-up vaporizer. In another example, the main vaporizer 221 may not be heating the hydrogen fuel to the desired temperature and, thus, the secondary vaporizer 223 operates as a trim vaporizer to add supplemental heat to the hydrogen fuel and heat the hydrogen fuel to the desired temperature. Such a condition may occur when, for example, the heat provided by the primary heat source 225 to the main vaporizer 221 is not sufficient to heat the hydrogen fuel to the desired temperature.

The secondary vaporizer 223 is thermally coupled to a secondary heat source 227. With the secondary vaporizer 223 operating as a combination start-up and trim vaporizer, the secondary heat source 227 is preferably a heat source external to the engine 100 that may provide heat for the secondary vaporizer 223 independent of whether or not the engine 100 is running and can be used, for example, during start-up (or prior to start-up) of the engine 100. The secondary heat source 227 may include, for example, an electrical power source, a catalytic heater or burner, and/or a bleed airflow from an auxiliary power unit. The secondary heat source 227 may be integral to the secondary vaporizer 223, such as when the secondary vaporizer 223 includes one or more electrical resistance heaters, or the like, that are powered by the electrical power source.

Figure 4:
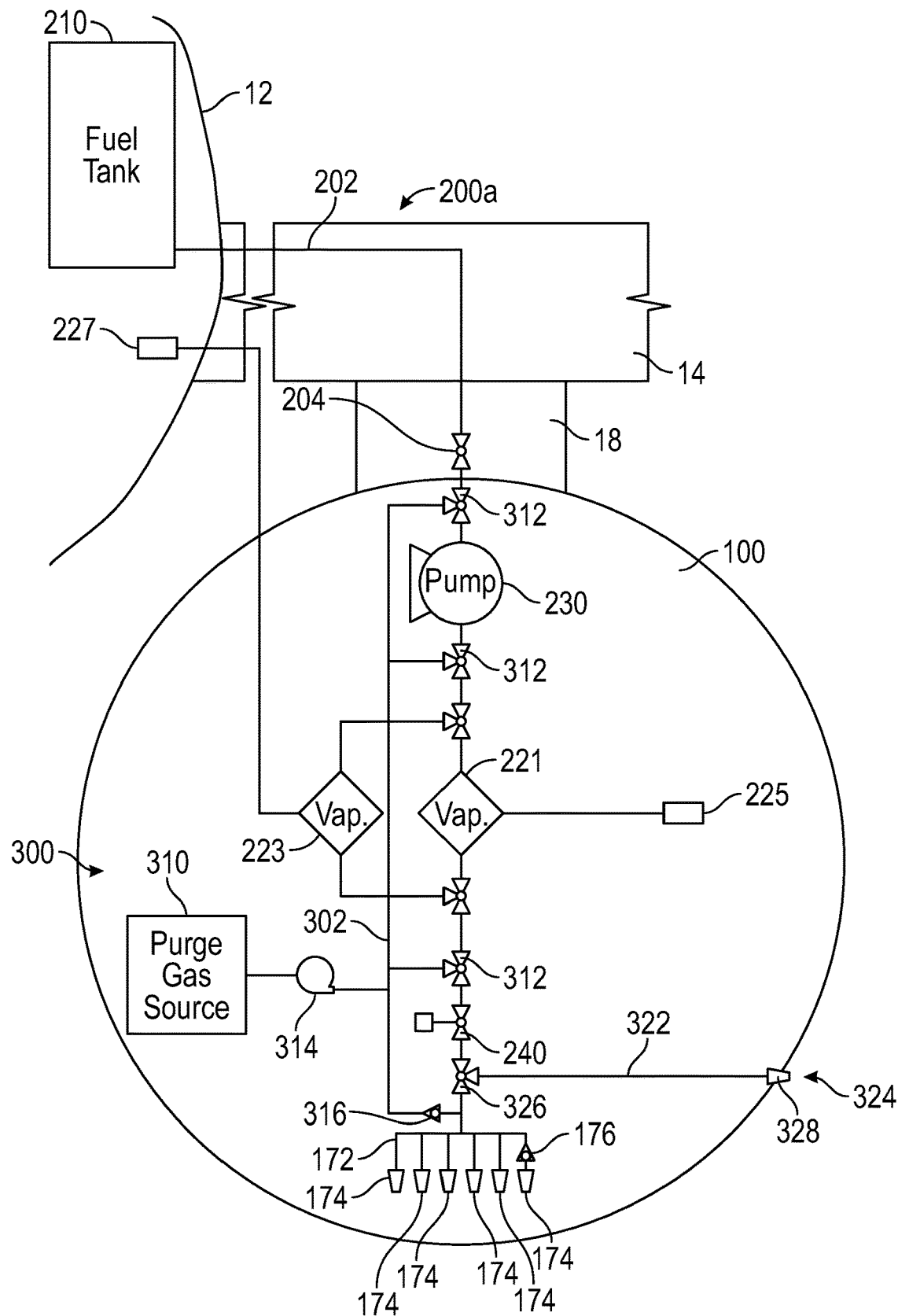
FIG. 4 is a schematic view of the fuel system with an alternate arrangement of vaporizers.

As noted above, the vaporizers 221, 223 may be thermally coupled to any suitable heat source. For example, the main vaporizer 221 and/or the secondary vaporizer 223 may be thermally coupled to both waste heat from the engine 100 and a heat source external to the engine 100. In the embodiment shown in FIG. 3, the main vaporizer 221 and the secondary vaporizer 223 are located in series relative to the flow of hydrogen in the fuel delivery assembly 202, with the secondary vaporizer 223 being downstream from the main vaporizer 221. Other arrangements of the vaporizers 221, 223 may be used, however, such as the main vaporizer 221 and the secondary vaporizer 223 being arranged in parallel to each other, as shown in FIG. 4. FIG. 4 is a schematic view of a fuel system 200a with the main vaporizer 221 and the secondary vaporizer 223 arranged in parallel. Although the arrangements of vaporizers 221, 223 differ between FIG. 3 and FIG. 4, the remaining components of the fuel system 200a are the same or similar to the components shown in FIG. 3.

Figure 5A:
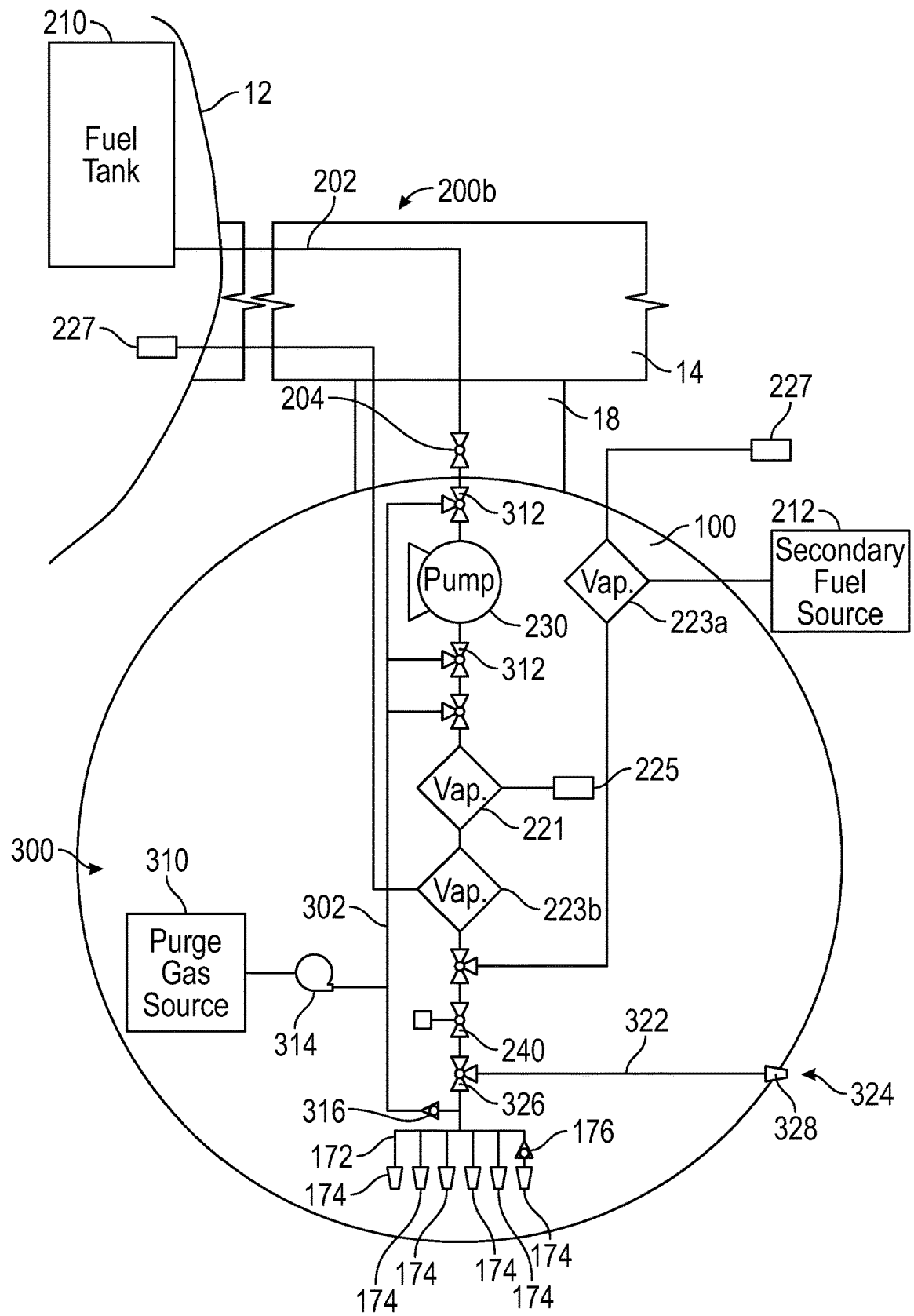
FIGS. 5A, 5B, and 5C are schematic views of the fuel system each having further arrangements of vaporizers.
Figure 5B:
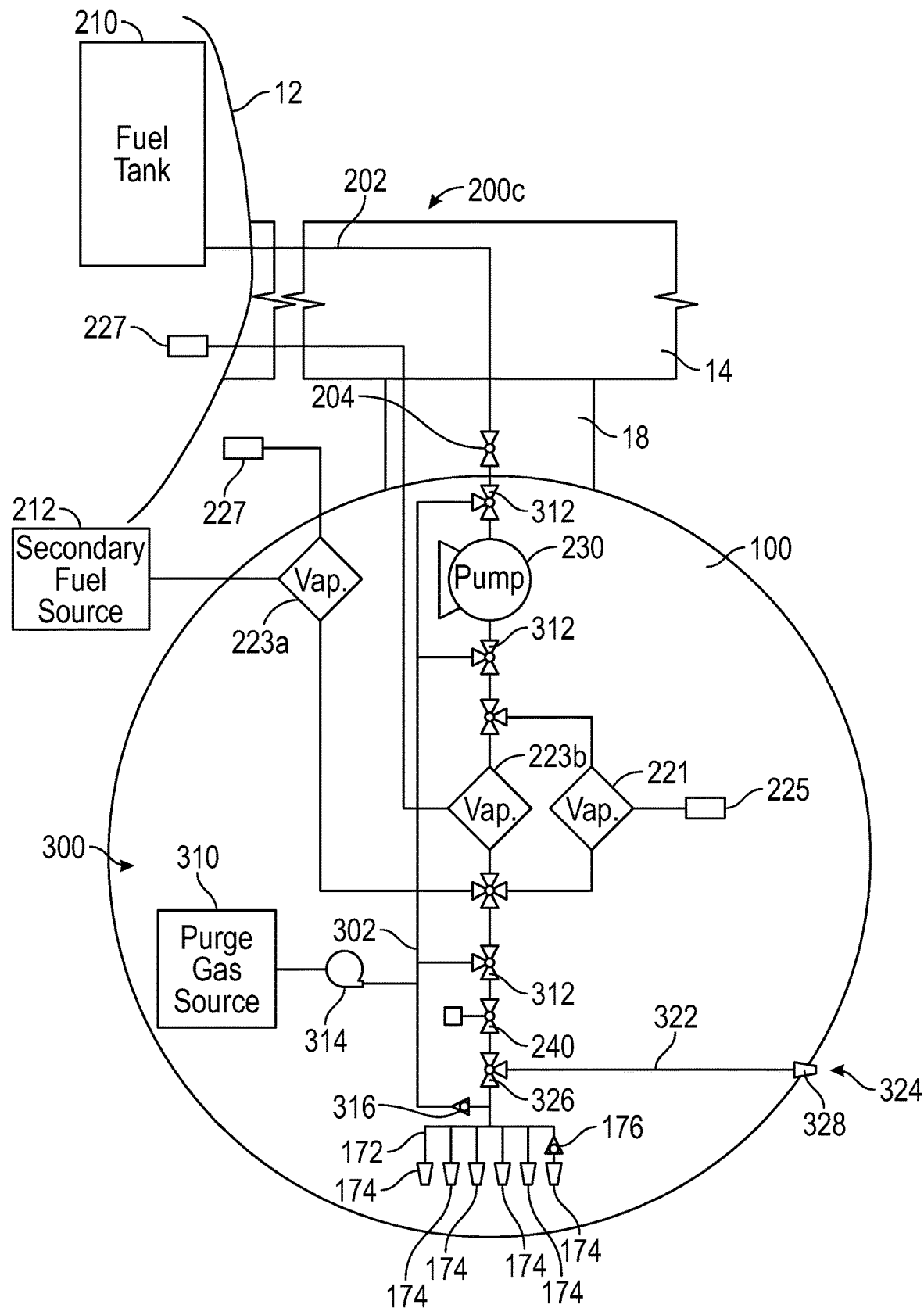
Figure 5C:
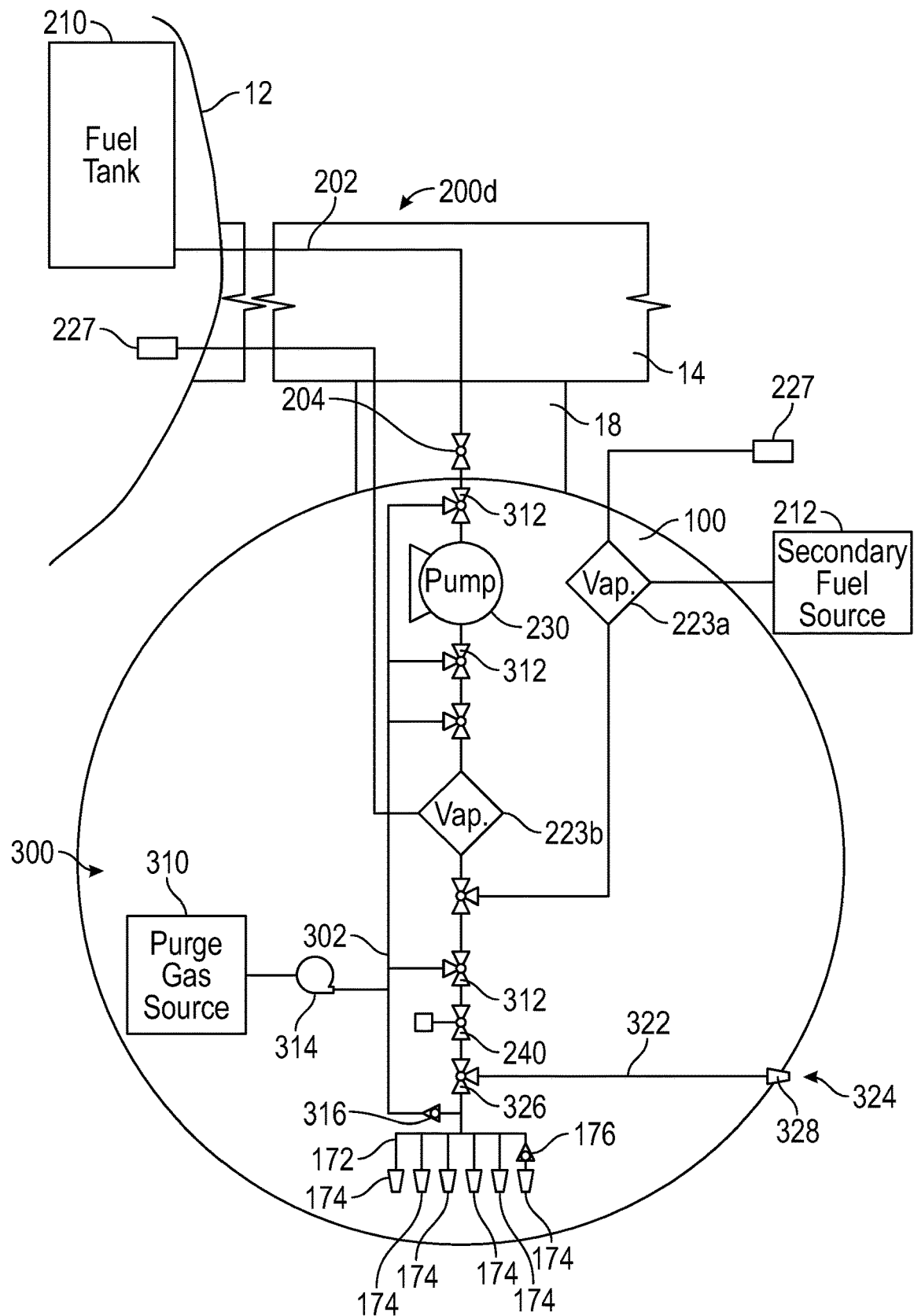

FIGS. 5A, 5B, and 5C show additional arrangements of vaporizers in a fuel system 200b, 200c, 200d. FIGS. 5A, 5B, and 5C are schematic views of the fuel system 200b, 200c, 200d. In the arrangement shown in FIGS. 5A and 5B, a plurality of secondary vaporizers 223 are used, with one being a start-up vaporizer 223a and the other being a trim vaporizer 223b. In the embodiments shown in FIGS. 3 and 4, the secondary vaporizer 223 is positioned to receive hydrogen fuel from the same hydrogen source (e.g., fuel tank 210) as the main vaporizer 221. The start-up vaporizer 223a may, however, be positioned to receive hydrogen fuel from a secondary hydrogen fuel source 212 that is different than the main vaporizer 221. The secondary hydrogen fuel source 212 may be attached to the main fuel tank (fuel tank 210) or be a secluded tank. Using a secondary hydrogen fuel source 212 allows the delivery system for the hydrogen fuel to be sized only to handle a limited fuel flow (up to idle, for example). Using the secondary hydrogen fuel source 212 helps size and optimize the heat source 227 and the start-up vaporizer 223a to better align with starting requirements.

The trim vaporizer 223b may be positioned in series with the main vaporizer 221, as shown in FIG. 5A, or in parallel with the main vaporizer 221, as shown in FIG. 5B. In another alternative arrangement, the trim vaporizer 223b may be omitted, as shown in FIG. 5C. Although the arrangements of vaporizers 221, 223 in FIGS. 5A to 5C differ the arrangement shown in FIGS. 3, the same or similar components of the fuel system 200 shown in FIG. 3 may be used in the arrangements of the fuel system 200b, 200c, 200d shown in FIGS. 5A to 5C. The following discussion will focus on FIG. 3, but it also applies to the arrangements shown in FIGS. 4 to 5C.

As shown in FIG. 3, the fuel delivery assembly 202 also includes a pump 230 to induce the flow of the hydrogen fuel through the fuel delivery assembly 202 to the engine 100. The pump 230 may generally be the primary source of pressure rise in the fuel delivery assembly 202 between the fuel tank 210 and the engine 100. The pump 230 may be configured to increase a pressure in the fuel delivery assembly 202 to a pressure greater than a pressure within a combustion chamber of the combustion section 114 of the engine 100 (FIG. 2). In this embodiment, the pump 230 is positioned within the flow of hydrogen fuel in the fuel delivery assembly 202 at a location upstream of the main vaporizer 221. In this embodiment, the pump 230 is positioned external to the fuselage 12 and the wing 14, and is positioned at least partially within the pylon 18, or at least partially within the engine 100. More specifically, the pump 230 is positioned within the engine 100. With the pump 230 located in such a position, the pump 230 may be any suitable pump configured to receive the flow of hydrogen fuel in substantially completely a liquid phase. In other embodiments, however, the pump 230 may be positioned at any other suitable locations, including other positions within the flow path of the hydrogen fuel. For example, the pump 230 may be located downstream of the main vaporizer 221 and may be configured to receive the flow of hydrogen fuel through the fuel delivery assembly 202 in a substantially completely a gaseous phase or a supercritical phase.

The fuel system 200 also includes a fuel metering unit in fluid communication with the fuel delivery assembly 202. In this embodiment, the fuel metering unit is a metering valve 240 positioned downstream of the vaporizers 221, 223 and the pump 230. The metering valve 240 is configured to receive hydrogen fuel in a substantially completely gaseous phase, or in a substantially completely supercritical phase. The metering valve 240 is further configured to provide the flow of fuel to the engine 100 in a desired manner. More specifically, as depicted schematically in FIG. 3, the metering valve 240 is configured to provide a desired volume of hydrogen fuel at, for example, a desired flow rate, to a fuel manifold 172 of the engine 100. The fuel manifold 172 then distributes (provides) the hydrogen fuel received to a plurality of fuel nozzles 174 within the combustion section 114 of the engine 100, where the hydrogen fuel is mixed with compressed air and the mixture of hydrogen fuel and compressed air is combusted to generate combustion gases that drive the engine 100. Adjusting the metering valve 240 changes the volume of fuel provided to the combustion section 114 of the engine 100 and, thus, changes the amount of propulsive thrust produced by the engine 100 to propel the aircraft 10.

The hydrogen fuel used in the engine 100 and in the fuel system 200 may be substantially pure hydrogen molecules (diatomic hydrogen). As diatomic hydrogen is the smallest molecule known to exist, hydrogen can be difficult to contain, particularly, in the gaseous form. Hydrogen, when in a gaseous form, also tends to seep through materials and attachment points between components without leaving residue. The hydrogen is prone to leak through conventional seals and other small orifices such as cracks that may form in the fuel system 200 over time. When hydrogen fuel is not being provided to the engine 100 for combustion, the hydrogen is purged from the fuel system 200. The fuel system 200 of this embodiment includes a hydrogen fuel purge system 300 that is used to purge hydrogen fuel from at least a portion of the fuel system 200. For example, a commercial aircraft 10 may land and, after pulling up to the gate, shuts down either for a temporary period of time before departing on another flight or for a longer time, such as overnight. The hydrogen fuel purge system 300 may be used to purge a portion of the fuel system 200 after shutdown.

The hydrogen fuel purge system 300 uses a purge fluid to remove the hydrogen fuel from at least a portion of the fuel system 200. Any suitable purge fluid may be used, but, in the embodiments discussed herein, the purge fluid is a gas and will be referred to as a purge gas. The purge gas is preferably a substantially inert gas, and is not reactive, or is minimally reactive, with hydrogen. The inert gas may be a substantially thermally inert gas that does not encourage ignition or act as an oxidizer in any type of reaction with hydrogen as the fuel source to create combustion, flame, spark, or exothermic energy release. In some embodiments, the purge gas has a very low freezing point that is suitable for use in purging the low-temperature (cryogenic) systems of the fuel system 200. Examples of suitable purge gases include noble gases, such as helium, neon, argon, krypton, xenon, and radon. Examples of thermally inert gases that may be used as the purge gas include carbon dioxide, carbon monoxide, and the like. Commonly known fire suppressants may also be used as the purge gas. These fire suppressants include, but are not limited to, halon, FS227, NAF S 125, and NAF S 227. Another suitable purge gas includes nitrogen gas, such as diatomic nitrogen.

The purge gas is provided to the hydrogen fuel purge system 300 by a purge gas source 310. In some embodiments, the purge gas source 310 may be a tank that stores the purge gas. In other embodiments where the purge gas is nitrogen, the purge gas source 310 may be a nitrogen separator that is configured to extract (strip) nitrogen from the atmosphere or other nitrogen generation systems. Suitable nitrogen generation systems include, for examples, those used as part of existing fuel tank inerting systems or On-Board Inert Gas Generation Systems (OBIGGSs). The purge gas source 310 is shown in FIG. 3 as being located within the engine 100, but the purge gas source 310 may be located at other suitable locations external to the engine 100. For example, the purge gas source 310 may be positioned at other locations in the aircraft 10 including, for example, in the fuselage 12, the wing 14, or the pylon 18.

The purge gas flows from the purge gas source 310 into a purge gas delivery assembly 302. The purge gas delivery assembly 302 includes tubes, pipes, and the like, to fluidly connect the various components of the hydrogen fuel purge system 300 to the fuel system 200. In the embodiments discussed herein, the purge gas delivery assembly 302 fluidly connects the purge gas source 310 to at least one position in the fuel system 200 and, more specifically, the fuel delivery assembly 202. More specifically, in the embodiment shown in FIG. 3, the purge gas delivery assembly 302 is fluidly coupled to the fuel delivery assembly 202 using a diverter valve 312. The diverter valve 312 may be used to selectively couple the purge gas delivery assembly 302 to the fuel delivery assembly 202. In a first position, the diverter valve 312 allows hydrogen fuel to flow through the fuel delivery assembly 202, but, in a second position, the diverter valve 312 closes off a portion of the fuel system 200 and fluidly couples the purge gas source 310 to the fuel delivery assembly 202.

The embodiment of FIG. 3 shows a plurality of diverter valves 312. These diverter valves 312 are shown to illustrate various positions where the purge gas can be introduced into the fuel system 200, but some of these diverter valves 312 may be omitted. The diverter valves 312 are positioned upstream of the metering valve 240, the secondary vaporizer 223, the main vaporizer 221, and the pump 230, respectively. A diverter valve 312 may be positioned directly upstream of each of these components as shown. The diverter valve 312 may be positioned in the second position to isolate the components upstream of the diverter valve 312, allowing purge gas to be introduced at the diverter valve 312 and directed to the components downstream of the diverter valve 312. Thus, the purge gas may be introduced upstream of the metering valve 240, the secondary vaporizer 223, the main vaporizer 221, and/or the pump 230 and, in some embodiments, directly upstream of each of these components.

Although the purge gas may be used to push the hydrogen fuel through the fuel system 200 and out the fuel nozzles 174 for a venting operation, the hydrogen and purge gas are preferably vented overboard. The hydrogen fuel purge system 300 includes a vent line 322 that is used to vent the hydrogen fuel and to purge gas externally to the engine 100. In this embodiment, the vent line 322 is fluidly coupled to a vent 324 having a vent opening on the exterior of the engine 100, such as the outer casing 106 or the outer nacelle 134, for example. The vent 324 may be located at other locations on the aircraft 10 including, for example, the wing 14 or a position on the fuselage 12, such as on the empennage 16, as shown in FIG. 1. A diverter valve 326 is used to fluidly couple the fuel delivery assembly 202 to the vent line 322 and the vent 324. The diverter valve 326 may be used to selectively couple the fuel delivery assembly 202 to the vent line 322 and the vent 324. In a first position, the diverter valve 326 allows hydrogen fuel to flow through the fuel delivery assembly 202, but, in a second position, the diverter valve 326 closes off a portion of the fuel system 200 and fluidly couples the fuel delivery assembly 202 to the vent line 322 and the vent 324. In the embodiment shown in FIG. 3, the diverter valve 326 is positioned upstream of the fuel manifold 172 and downstream of the metering valve 240. In this way, the components upstream of the fuel input array, which, in this embodiment, are the fuel manifold 172 and the fuel nozzles 174, can be purged of hydrogen fuel. Although only one vent 324 is shown, a plurality of vents 324 may be used. In such a configuration, the plurality of vents 324 may be connected to a single vent line 322, but in other embodiments, each vent 324 may be fluidly connected to a corresponding vent line 322 and diverter valve 326 at a plurality of locations in the fuel delivery assembly 202.

The hydrogen fuel purge system 300 also includes a pump 314 that is configured to increase the pressure of the purge gas to a pressure sufficient to push the hydrogen fuel through the fuel delivery assembly 202, the vent line 322, and out the vent 324. One of the diverter valves 312 connected to the purge gas delivery assembly 302 is positioned in the second position and the diverter valve 326 connected to the vent line 322 is also positioned in the second position. The pump 314 may then be operated to push the purge gas and the hydrogen through the fuel delivery assembly 202 and out the vent 324. In such a configuration, the vent 324 is fluidly coupled to the fuel delivery assembly 202 and configured to vent hydrogen fuel from the fuel delivery assembly 202 when the purge gas is provided to the fuel delivery assembly 202 from the purge gas source 310.

As noted above, hydrogen is highly reactive and has wide flammability limits. When exposed to even a small amount of oxygen, hydrogen has a very low ignition energy requirement, even as little as a static spark. An anti-ignition system may, thus, be used to prevent ignition of the vented hydrogen and the ignition of hydrogen upstream of the vent 324, including within the fuel delivery assembly 202. Anti-ignition systems may include those that prevent sparks, such as grounding systems. In the embodiment shown in FIG. 3, the anti-ignition system includes a flame arrestor 328. The flame arrestor 328 is positioned in the vent line 322 proximate to the vent 324. Any suitable flame arrestor 328 may be used. The flame arrestor 328 may be, for example, a serpentine passage formed in the vent line 322, such as a P-trap, that prevents a continuous, unbroken gas path to the fuel delivery assembly 202. Other suitable flame arrestors 328 may include a wire screen or a diffusion system where the vented gas bubbles through a liquid, such as water, before reaching the vent 324.

In the embodiment shown in FIG. 3, the purge gas delivery assembly 302 is also fluidly connected to the fuel delivery assembly 202 at a position between the diverter valve 326 connected to the vent line 322 and the fuel nozzles 174. A check valve 316 is positioned in this line of the purge gas delivery assembly 302 to allow the purge gas to flow into the fuel delivery assembly 202, but to prevent any back flow from the fuel delivery assembly 202 into the purge gas delivery assembly 302. Introducing purge gas at this point allows the fuel array (e.g., the fuel manifold 172 and the fuel nozzles 174) to remain charged with purge gas post-shutdown from the diverter valve 312 and the check valve 316 forward. With the diverter valve 326 connected to the vent line 322 in the first position, the vent line 322 and the vent 324 are closed, entrapping purge gas, as a buffer, between the upstream components of the fuel delivery assembly 202 and ambient air, which contacts fuel check valves 176 (only one shown in FIG. 3). This entrapped purge gas may be monitored using a sensor, such as a pressure sensor, communicatively coupled to a controller, such as the engine controller 180, to monitor the system integrity, for example. The engine controller 180 may, thus, sense a loss in pressure, which could indicate a leak in the fuel delivery assembly 202.

Figure 6:
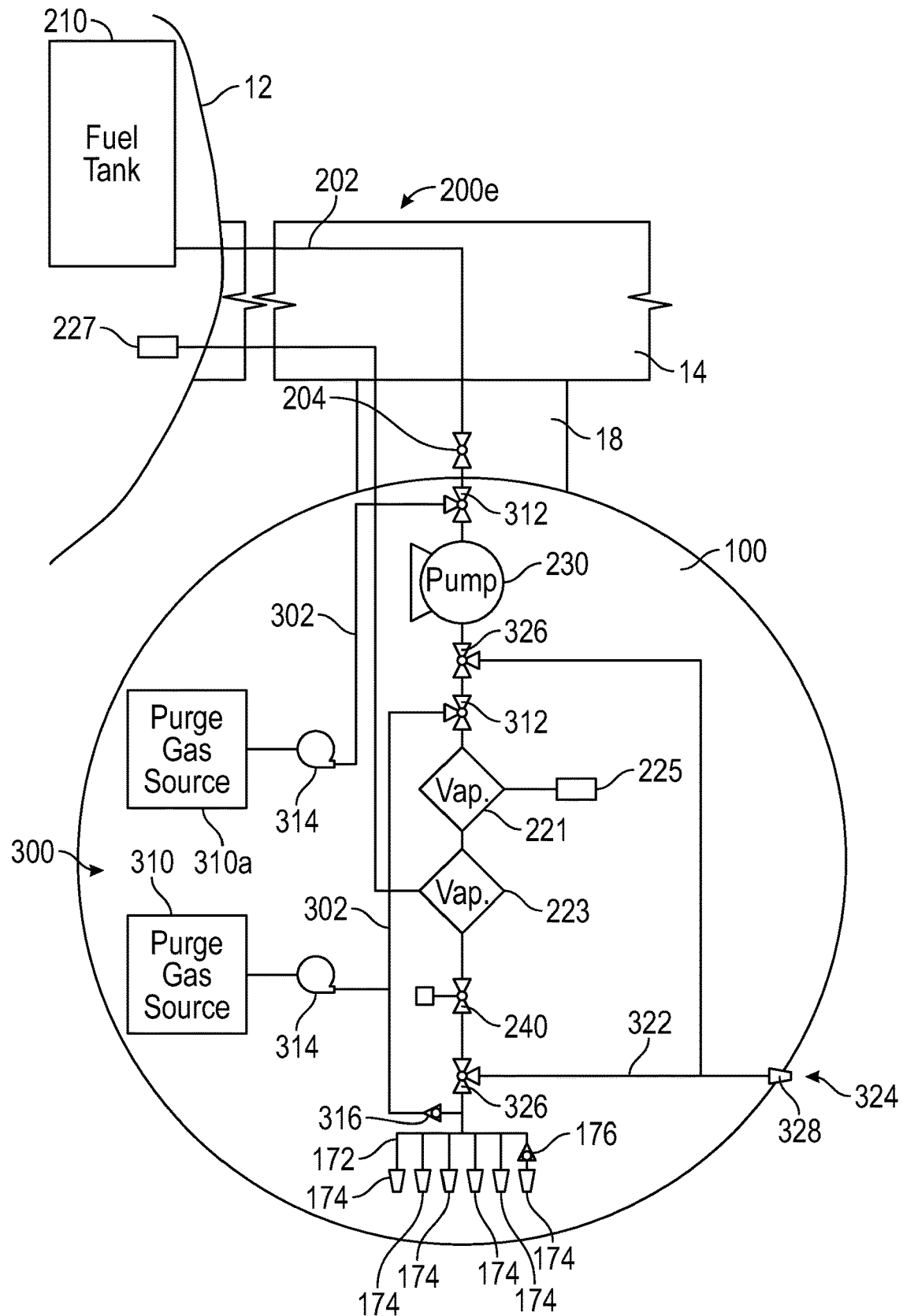
FIG. 6 is a schematic view of the fuel system having a plurality of vent connections and purge sources.

FIG. 6 is a schematic view of the fuel system 200e having a plurality of vent connections to the fuel delivery assembly 202. Other than the distinctions noted below, the remaining components and arrangement of the fuel system 200e are the same or similar to the components of the fuel system 200 shown in FIG. 3. In the embodiment shown in FIG. 3, one diverter valve 326 is shown to fluidly couple the fuel delivery assembly 202 to the vent 324 on the exterior of the aircraft 10. In some embodiments, the fuel delivery assembly 202 may fluidly connect to the vent 324 at a plurality of locations. As shown in FIG. 6, for example, one connection to the vent 324 is located as described above with respect to FIG. 3, and the other connection to the vent 324 is downstream of the pump 230 and upstream of the vaporizers 221, 223.

In this configuration, different portions of the fuel delivery assembly 202 may be purged at different times or using different purge gases. Here, two different purge gases are used. One purge gas, such as nitrogen, is used for the components that are operated at higher temperatures when the hydrogen fuel is in a gaseous phase or a supercritical phase. Another purge gas, such as helium, may be used for the components that are operated at lower temperatures when the hydrogen fuel is in a liquid phase. The fuel delivery assembly 202 is fluidly coupled to a second purge gas source 310a that contains the second purge gas, such as helium. If nitrogen is used as a purge gas for the portions of the fuel system 200e that convey the hydrogen fuel in the liquid phase, there is a risk that some of the nitrogen purge gas may solidify in these components, forming, for example, nitrogen crystals in the fuel system 200e. In contrast, helium can remain suspended in the hydrogen fuel when the hydrogen fuel is a liquid, and, thus, helium may be preferred for the portions of the fuel delivery assembly 202 that convey the hydrogen fuel in the liquid phase. Because of the cost of helium, minimizing the use of helium may be preferred, and, thus, another purge gas, such as nitrogen, is used for other parts of the fuel system 200.

Figure 7:
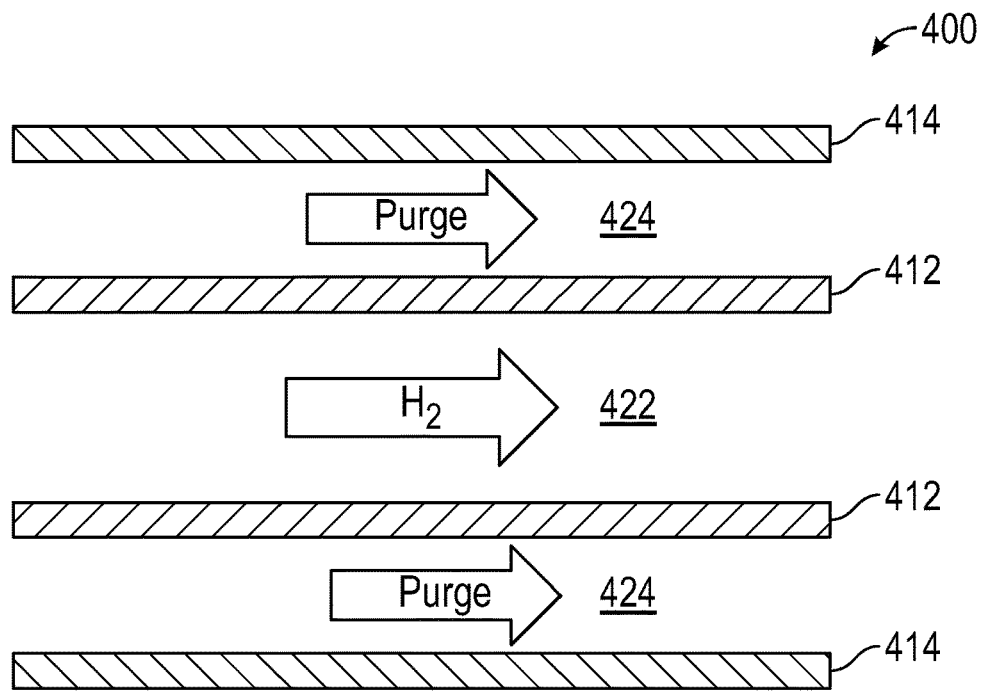
FIG. 7 is a schematic cross-sectional view of a double-walled pipe that may be used as part of the fuel system.

FIG. 7 is a schematic cross-sectional view of a double-walled pipe 400 that may be used as part of the fuel delivery assembly 202 to convey the hydrogen fuel. In the embodiments discussed above, the purge gas may flow through the same passages of the fuel delivery assembly 202 as the hydrogen fuel, but in addition (or alternatively), the purge gas may flow through a separate passage such that the purge gas can be used as a buffer between the hydrogen fuel and the surrounding environment. In such a manner, the purge gas may be used to remove hydrogen that leaks from the hydrogen flow path through the vent 324. The double-walled pipe 400 includes an inner wall 412 and an outer wall 414. The inner wall 412 of this embodiment is annular and defines a hydrogen fuel flow path 422. Hydrogen fuel flows through the hydrogen fuel flow path 422 as the hydrogen fuel is conveyed in the fuel delivery assembly 202 from the fuel tank 210 to the fuel nozzles 174. The outer wall 414 circumscribes the inner wall 412 and defines an annular outer flow path 424 (or cavity) between the inner wall 412 and the outer wall 414. In some embodiments, the outer flow path 424 may be subjected to a vacuum to help to maintain the temperature of the hydrogen fuel in the hydrogen fuel flow path 422. In this embodiment, the hydrogen fuel flow path 422 is fluidly coupled to the purge gas source 310, the vent line 322, and the vent 324. Such fluid connections may be made in a manner similar to that discussed above, but, in some embodiments, the diverter valves 312, 326 may be omitted. The purge gas may then flow through the outer flow path 424 to remove any hydrogen in case of a leak. Accordingly, the outer flow path 424 is fluidly coupled to the purge gas source 310 to receive the purge gas and configured to direct the purge gas flow therethrough. The outer flow path 424 may also be fluidly coupled to the vent 324 to vent the purge gas flowing through the outer flow path 424.

Figure 8:
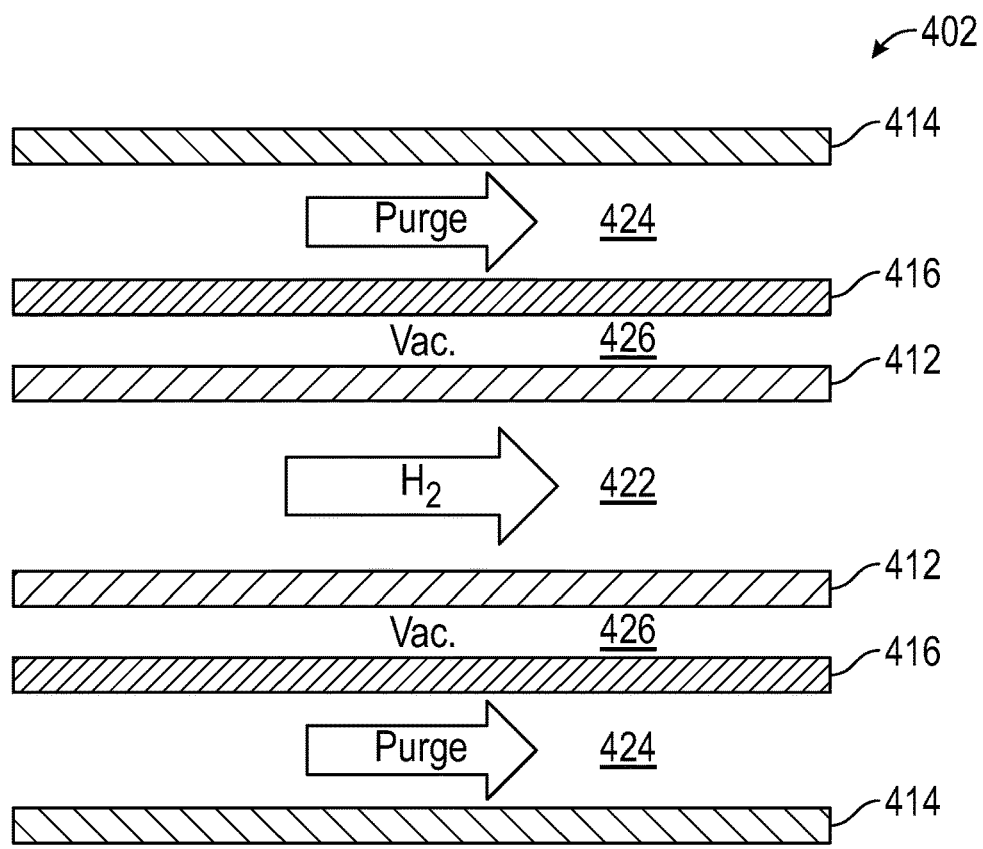
FIG. 8 is a schematic cross-sectional view of a triple-walled pipe that may be used as part of the fuel system.

FIG. 8 is a schematic cross-sectional view of a triple-walled pipe 402 that may be used as part of the fuel delivery assembly 202 to convey the hydrogen fuel. In some embodiments, a triple-walled pipe 402 pipe may be used in portions of the fuel delivery assembly 202 in a manner similar to the double-walled pipe 400 shown in FIG. 7. The triple-walled pipe 402 shown in FIG. 8 further includes a middle wall 416. The middle wall 416 circumscribes the inner wall 412 and defines an annular middle flow path 426 (or cavity) between the inner wall 412 and the middle wall 416. The outer wall 414 circumscribes both the middle wall 416 and the inner wall 412, and the outer flow path 424 is formed between the middle wall 416 and the outer wall 414. The middle flow path 426 may be a subjected to a vacuum to help to maintain the temperature of the hydrogen fuel in the hydrogen fuel flow path 422.

Further aspects of the present disclosure are provided by the subject matter of the following clauses.

A hydrogen fuel system for providing hydrogen to a power generator includes a fuel delivery assembly, a purge gas source, and a vent. The fuel delivery assembly is configured to receive hydrogen fuel from a hydrogen fuel source and to provide the hydrogen fuel from the hydrogen fuel source to the power generator. The purge gas source is fluidly coupled to the fuel delivery assembly and configured to provide a purge gas to the fuel delivery assembly. The vent is fluidly coupled to the fuel delivery assembly and configured to vent hydrogen fuel from the fuel delivery assembly when the purge gas is provided to the fuel delivery assembly.

The hydrogen fuel system of the preceding clause, wherein the purge gas is one of a noble gas, nitrogen, carbon dioxide, carbon monoxide, or a fire suppressant.

The hydrogen fuel system of any of the preceding clauses, wherein the fuel delivery assembly includes a double-walled pipe having an inner wall and an outer wall. The inner wall defines a hydrogen fuel flow path. The outer wall circumscribes the inner wall and defines an outer flow path between the inner wall and the outer wall. The outer flow path is fluidly coupled to the purge gas source to receive the purge gas and configured to direct the purge gas flow therethrough.

The hydrogen fuel system of any of the preceding clauses, wherein the outer flow path is fluidly coupled to the vent to vent the purge gas flowing through the outer flow path.

The hydrogen fuel system of any of the preceding clauses, wherein the fuel delivery assembly includes a triple-walled pipe having an inner wall, an outer wall, and a middle wall. The inner wall defines a hydrogen fuel flow path. The middle wall circumscribes the inner wall and defines a cavity between the inner wall and the middle wall. The outer wall circumscribes the middle wall and the inner wall and defines an outer flow path between the inner wall and the outer wall. The outer flow path is fluidly coupled to the purge gas source to receive the purge gas and configured to direct the purge gas flow therethrough.

The hydrogen fuel system of any of the preceding clauses, wherein the outer flow path is fluidly coupled to the vent to vent the purge gas flowing through the outer flow path.

The hydrogen fuel system of any of the preceding clauses, further comprising a purge gas delivery assembly and a diverter valve. The purge gas delivery assembly fluidly connects the purge gas source to at least one position in the fuel delivery assembly. The diverter valve fluidly couples the purge gas delivery assembly to the fuel delivery assembly.

The hydrogen fuel system of any of the preceding clauses, wherein the diverter valve includes a first position and a second position. In the first position, the diverter valve allows hydrogen fuel to flow through the fuel delivery assembly. In the second position, the diverter valve closes off a portion of the hydrogen fuel system and fluidly couples the purge gas source to the fuel delivery assembly.

The hydrogen fuel system of any of the preceding clauses, further comprising a vent line fluidly connecting the fuel delivery assembly to the vent.

The hydrogen fuel system of any of the preceding clauses, further comprising a flame arrestor positioned in the vent line proximate to the vent.

The hydrogen fuel system of any of the preceding clauses, further comprising a diverter valve fluidly coupling the fuel delivery assembly to the vent line, the diverter valve including a first position and a second position. In the first position, the diverter valve allows hydrogen fuel to flow through the fuel delivery assembly. In the second position, the diverter valve closes off a portion of the hydrogen fuel system and fluidly couples the fuel delivery assembly to the vent line.

The hydrogen fuel system of any of the preceding clauses, further comprising a fuel input array. The fuel delivery assembly is selectively fluidly coupled to the vent at a position upstream of the fuel input array.

The hydrogen fuel system of any of the preceding clauses, further comprising a fuel metering unit. The fuel delivery assembly is selectively fluidly coupled to the vent at a position downstream of the fuel metering unit.

The hydrogen fuel system of any of the preceding clauses, wherein the purge gas source is selectively fluidly coupled to the fuel delivery assembly at a position upstream of the fuel metering unit.

The hydrogen fuel system of any of the preceding clauses, wherein the purge gas source is fluidly coupled to the fuel delivery assembly at a position downstream of the fuel metering unit and upstream of the fuel input array.

The hydrogen fuel system of any of the preceding clauses, further comprising a check valve positioned in the purge gas source between the purge gas source and the fuel delivery assembly. The check valve is configured to allow the purge gas to flow into the fuel delivery assembly and to prevent back flow from the fuel delivery assembly into the purge gas source.

The hydrogen fuel system of any of the preceding clauses, further comprising at least one vaporizer in communication with the fuel delivery assembly. The fuel delivery assembly receives the hydrogen fuel in a liquid phase and the at least one vaporizer is configured to heat the hydrogen fuel in the liquid phase to at least one of a gaseous phase and a supercritical phase.

The hydrogen fuel system of any of the preceding clauses, further comprising a fuel tank configured to hold the hydrogen fuel in a liquid phase. The fuel tank is the hydrogen fuel source and the vaporizer is located between the fuel tank and the power generator.

An aircraft comprising the hydrogen fuel system of any of the preceding clauses, wherein the power generator is a gas turbine engine.

The aircraft of any of the preceding clauses, further comprising a fuselage. The fuel tank is located at least partially in the fuselage.

Although the foregoing description is directed to the preferred embodiments, it is noted that other variations and modifications will be apparent to those skilled in the art, and may be made without departing from the spirit or the scope of the disclosure. Moreover, features described in connection with one embodiment may be used in conjunction with other embodiments, even if not explicitly stated above.

What is claimed is:

1. A hydrogen fuel system for providing hydrogen to a power generator, the hydrogen fuel system comprising:
    a fuel input array;
    a fuel delivery assembly configured to receive hydrogen fuel in a liquid phase from a hydrogen fuel source and to provide the hydrogen fuel from the hydrogen fuel source to the fuel input array;
    at least one vaporizer in communication with the fuel delivery assembly, the at least one vaporizer being configured to heat the hydrogen fuel in the liquid phase to at least one of a gaseous phase or a supercritical phase;
    a fuel metering unit positioned upstream of the fuel input array, the fuel metering unit being adjustable to change a volume of fuel provided to the fuel input array;
    a purge gas source;
    a purge gas delivery assembly fluidly coupling the purge gas source to the fuel delivery assembly at a plurality of positions including a first position and a second position, the first position being upstream of the at least one vaporizer;
    a purge gas pump located in the purge gas delivery assembly and configured to provide a purge gas from the purge gas source to the fuel delivery assembly at the plurality of positions;
    a vent fluidly coupled to the fuel delivery assembly and configured to vent hydrogen fuel from the fuel delivery assembly when the purge gas is provided to the fuel delivery assembly, the vent being fluidly coupled to the fuel delivery assembly at a connection position, the connection position being upstream of the fuel input array and downstream of the fuel metering unit;
    a vent valve positionable to fluidly couple the vent to the fuel delivery assembly and close off a portion of the hydrogen fuel system downstream of the connection position;
    an ambient air valve located between the fuel input array and ambient air downstream of the fuel input array and configured to prevent a flow of the ambient air into the fuel delivery assembly;
    a purge gas backflow valve, wherein the purge gas source is fluidly coupled to the fuel delivery assembly at the second position, which is downstream of the vent valve and upstream of the fuel input array, and is configured to provide the purge gas to the fuel delivery assembly between the fuel input array and the vent valve and the purge gas backflow valve is located in the fuel delivery assembly to prevent back flow from the fuel delivery assembly to the purge gas delivery assembly; and
    a controller operatively connected to the purge gas pump and one or more valves including one or more of the vent valve, the ambient air valve, or the purge gas backflow valve, the controller being configured to operate the purge gas pump and adjust the one or more valves to entrap purge gas, as a buffer, between the connection position and the fuel input array.

2. The hydrogen fuel system of claim 1, wherein the purge gas is one of a noble gas, nitrogen, carbon dioxide, carbon monoxide, or a fire suppressant.

3. The hydrogen fuel system of claim 1, wherein the fuel delivery assembly includes a double-walled pipe having an inner wall and an outer wall, the inner wall defining a hydrogen fuel flow path, the outer wall circumscribing the inner wall and defining an outer flow path between the inner wall and the outer wall, the outer flow path being fluidly coupled to the purge gas source to receive the purge gas and configured to direct the purge gas flow therethrough.

4. The hydrogen fuel system of claim 3, wherein the outer flow path is fluidly coupled to the vent to vent the purge gas flowing through the outer flow path.

5. The hydrogen fuel system of claim 1, wherein the fuel delivery assembly includes a triple-walled pipe having an inner wall, an outer wall, and a middle wall, the inner wall defining a hydrogen fuel flow path, the middle wall circumscribing the inner wall and defining a cavity between the inner wall and the middle wall, the outer wall circumscribing the middle wall and the inner wall, and defining an outer flow path between the inner wall and the outer wall, the outer flow path being fluidly coupled to the purge gas source to receive the purge gas and configured to direct the purge gas flow therethrough.

6. The hydrogen fuel system of claim 5, wherein the outer flow path is fluidly coupled to the vent to vent the purge gas flowing from the outer flow path.

7. The hydrogen fuel system of claim 1, further one or more diverter valves fluidly coupling the purge gas delivery assembly to the fuel delivery assembly.

8. The hydrogen fuel system of claim 7, wherein each diverter valve of the one or more diverter valves includes a first position and a second position,
   wherein, in the first position, the diverter valve allows hydrogen fuel to flow through the fuel delivery assembly, and
   wherein, in the second position, the diverter valve closes off a portion of the hydrogen fuel system and fluidly couples the purge gas source to the fuel delivery assembly.

9. The hydrogen fuel system of claim 1, further comprising a vent line fluidly connecting the fuel delivery assembly to the vent.

10. The hydrogen fuel system of claim 9, further comprising a flame arrestor positioned in the vent line proximate to the vent.

11. The hydrogen fuel system of claim 9, wherein the vent valve is a diverter valve fluidly coupling the fuel delivery assembly to the vent line, the diverter valve including a first position and a second position,
    wherein, in the first position, the diverter valve allows hydrogen fuel to flow through the fuel delivery assembly, and
    wherein, in the second position, the diverter valve closes off the portion of the hydrogen fuel system downstream of the connection position and fluidly couples the fuel delivery assembly to the vent line.

12. The hydrogen fuel system of claim 1, wherein the purge gas delivery assembly is selectively fluidly coupled to the fuel delivery assembly at a plurality of positions upstream of the vent valve.

13. The hydrogen fuel system of claim 1, wherein the purge gas backflow valve is a check valve positioned between the purge gas source and the fuel delivery assembly, the check valve being configured to allow the purge gas to flow into the fuel delivery assembly and to prevent back flow from the fuel delivery assembly into the purge gas source.

14. The hydrogen fuel system of claim 1, further comprising a fuel tank configured to hold the hydrogen fuel in a liquid phase, the fuel tank being the hydrogen fuel source, the at least one vaporizer being located between the fuel tank and the fuel input array.

15. An aircraft comprising:
    the hydrogen fuel system of claim 14,
    wherein the power generator is a gas turbine engine.

16. An aircraft comprising a fuselage and the hydrogen fuel system of claim 1, wherein the vent includes a vent opening and the vent opening is located on the fuselage.

17. An aircraft comprising:
    the hydrogen fuel system of claim 1,
    wherein the power generator is a gas turbine engine, and
    wherein the vent includes a vent opening, the vent opening being located on an exterior surface of the gas turbine engine.

18. The hydrogen fuel system of claim 12, wherein the purge gas delivery assembly is fluidly coupled to the fuel delivery assembly at a third position, the third position being a position downstream of the at least one vaporizer.

* * * * *